March 15, 1960     R. H. BOLTON     2,929,053

ELECTROMAGNETIC PICK-OFF APPARATUS

Filed Oct. 21, 1954     2 Sheets-Sheet 1

INVENTOR
ROBERT H. BOLTON
BY
ATTORNEY

March 15, 1960   R. H. BOLTON   2,929,053
ELECTROMAGNETIC PICK-OFF APPARATUS
Filed Oct. 21, 1954   2 Sheets-Sheet 2

INVENTOR
ROBERT H. BOLTON
BY
ATTORNEY

United States Patent Office 2,929,053
Patented Mar. 15, 1960

2,929,053

ELECTROMAGNETIC PICK-OFF APPARATUS

Robert Havelock Bolton, East Meadow, N.Y., assignor to Sperry Rand Corporation, a corporation of Delaware Application October 21, 1954, Serial No. 463,778

4 Claims. (Cl. 340—195)

The present invention relates to electromagnetic signal generator or pick-off devices for simultaneously providing two output voltage signals whose magnitudes are independent functions of the relative displacements of an object about two different axes.

In certain gyroscopic systems, for example, a pick-off device is often required for providing two output voltage signals whose magnitudes are independently related to angular displacements from predetermined null positions of one object with respect to another about two different axes. Such a problem may be encountered, for example, wherein it is desired to stabilize the relative position between the rotor element of a gyroscope and a follow-up member in a servo system of which the gyroscope may be a part.

Electromagnetic pick-off devices are known in the art for providing an output voltage signal related to the displacement of an armature about one axis. Generally such a device is comprised of a transformer arrangement wherein differential control of the coupling between pairs of transformer windings thereof is relied upon for its operation. However, capacitive coupling between transformer windings and harmonic resonances in the secondary transformer windings adversely affect the operation of such a device by decreasing the signal to noise ratio of the output voltage signal and increasing the magnitude of the voltage signal at the null position of the pick-off armature. Furthermore, when two adjacent transformer arrangements are utilized for providing two output voltage signals related to the displacements of an armature about two axes, the voltage signals provided may be adversely affected by cross-coupling between the two transformer arrangements.

It is an object of the present invention to provide a novel and improved electromagnetic apparatus for detecting relative movement from a null position between parts in a system around first and second mutually transverse axes.

It is another object of the present invention to provide an improved electromagnetic pick-off device for simultaneously providing two independent output voltage signals of substantially zero harmonic content and high signal to noise ratio whose magnitudes are independent linear functions of the relative displacements of an object with respect to a pair of different axes.

It is a further object of the present invention to provide such a device wherein the output voltage signals at null positions of the armature about the two different axes are substantially zero.

It is another object of the preesnt invention to provide such a pick-off device for providing two independent output voltage signals whose magnitudes are substantially linear functions of the angular displacements of one object with respect to another about two different axes.

It is yet another object of the present invention to provide a compact electromagnetic pick-off device as aforedescribed which is easily constructed and readily reproducible.

The foregoing and other objects of the present invention are attained by providing a pick-off device including a first pair of serially connected inductance coils symmetrically disposed on opposite sides of a first axis and a second pair of serially connected inductance coils symmetrically disposed on opposite sides of a second axis transversely of said first axis. The two pairs of coils are electrically connected in parallel between a pair of alternating current input terminals. A plurality of impedance means are connected across said input terminals in combination with said first pair of coils so as to effectively provide a first bridge-type network and in combination with said second pair of coils so as to effectively provide a second bridge-type network in parallel relationship with the first.

An armature for modifying the inductances of said coils is also provided, the armature being relatively displaceable with respect to the aforementioned first axis for changing the inductances of the coils of said first pair in opposite directions so as to change the magnitude of an output voltage signal provided at a pair of output terminals provided in the first bridge-type network. The armature is also relatively displaceable with respect to the aforementioned second axis for changing the inductances of the coils of said second pair in opposite directions so as to change the magnitude of an output voltage signal provided at a pair of output terminals provided in the second bridge-type network. The magnitudes of the output voltage signals provided are linearly variable, independent functions of armature displacements with respect to the aforesaid first and second axes, respectively.

Referring to the drawings.

Figure 1:
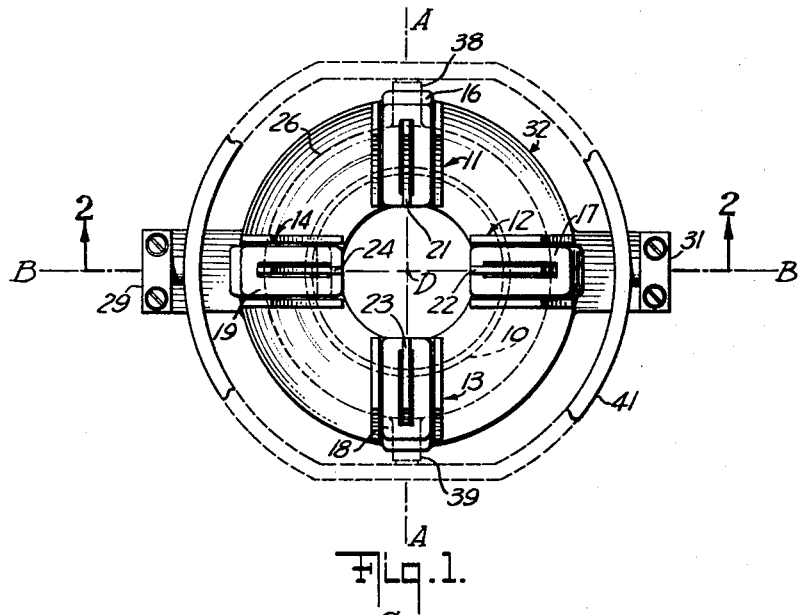
Fig. 1 is a plan view of an electromagnetic pick-off device in accordance with the present invention for providing two independent output voltage signals whose magnitudes are functions of the angular displacements of an armature about two different axes, parts of the device including the armature being shown in phantom by means of dashed lines.
Figure 2:
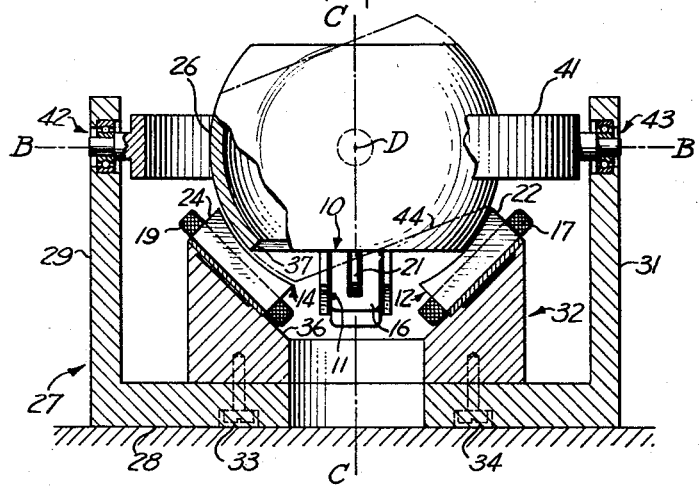
Fig. 2 is a sectional view of the pick-off device shown in Fig. 1 along the line 2—2 thereof.

Referring to Figs. 1 and 2, the pick-off device of the present invention includes a stator comprising four E-core elements 11–14 of ferromagnetic material, four inductance coils 16–19 disposed around center legs 21–24 of the cores 11–14, respectively, and an armature 26 of highly magnetic steel. The armature 26 and the core elements 11–14 are supported upon a metal frame 27 for relative angular displacement with respect to each other about two coplanar lines or axes A—A and B—B intersecting each other at right angles at a point D along a further axis C—C perpendicular to the plane of axes A—A and B—B.

The frame 27 comprises a base 28 having two arms 29 and 31 perpendicular thereto. Axis B—B passes through the arms 29 and 31, the arms 29 and 31 being symmetrically disposed on opposite sides of the axis A—A. Any suitable means may be employed for properly supporting the frame 27 upon an object with respect to which angular displacement of the armature 26 is to be detected.

A metallic bowl-shaped structure 32 concentric with axis C—C in Fig. 2 is supported upon the base 28 of frame 27 by suitable screws 33 and 34. Four suitable depressions are provided in an inner conical side 36 of structure 32 for supporting rectangularly shaped bases of the four E-core elements 11–14, respectively. The core elements 11–14 are cemented, for example, to the aforementioned depressions and should be disposed upon the conical side 36 of bowl-shaped structure 32 so that the center arms 22 and 24 of core elements 12 and 14, respectively, lie in a plane perpendicular to the plane of Fig. 1 along the axis B—B and so that the center arms 21 and 23 of core elements 11 and 13, respectively, lie in further plane perpendicular to the plane of Fig. 1 along the axis A—A.

The three parallel arms of each of E-core elements 11–14 are rectangular in cross section, the outer end surfaces thereof being machined so as to be conformal with a spherical zone. The center of a hypothetical sphere of which the aforementioned zone is a part is coincident with the intersection of the axes A—A, B—B and C—C at point D. The curved end surfaces of the arms of the core elements 11–14 comprise magnetic pole faces.

The inductance coils 16–19 are preferably identical to one another. The coils 16–19 may be wound upon dielectric insulating forms, not shown, which fit over the center legs of the E-core elements 11–14 for support, narrow air gaps being maintained between the inner surfaces of the end arms of each core element and the coil supported thereby. Each of coils 16–19 comprises a plurality of insulated turns of wire. Therefore, each of coils 16–19 could be wound directly upon the center arm of an E-core element, if desired rather than upon dielectric forms as described.

The armature 26 comprises a hollow spherical segment of magnetically permeable material whose center is made coincident with the intersection of the axes A—A, B—B and C—C at point D. The radius of the outer spherical surface of armature 26 is slightly smaller than the radii of the curved pole faces of the E-core elements 11–14. Therefore, narrow air gaps are provided between the outer spherical surface of armature 26 and the pole faces of core elements 11–14.

The armature 26 has an annular end face 37 that is bounded by a circular base line 10 of the armature and is conformal to the frustum of a cone whose apex is coincident with the intersection of the axes A—A, B—B and C—C at point D. The armature 26 is dimensioned so that when it is positioned with the plane of the base line 10 perpendicular to the axis C—C, one half of the areas of the curved pole faces of the core elements 11–14 are in opposing relationship with the outer spherical surface of the armature 26.

The armature 26 is supported for angular displacement about the axis A—A by means of suitable bearings 38 and 39 provided at diametrically opposite points in a gimbal ring 41, the aforesaid points being along the axis A—A. The ring 41 is made pivotable about the axis B—B by means of suitable bearings 42 and 43 in the arms 29 and 31, respectively, of frame 27. Therefore, armature 26 is supported for independent relative angular displacement with respect to the pole faces of E-cores 11–14 about two axes A—A and B—B.

In one application of the present invention a gyroscope (not shown) is supported within the hollow spherical armature segment 26 with the rotor thereof supported in suitable bearings (not shown), at the opposite ends of the segment 26 so that the gyro spin axis is concentric with the axis of the conical armature end face 37. In such an arrangement the armature 26 comprises the inner gimbal or rotor case of the gyroscope. Therefore, the angular position of the armature 26 about the axes A—A and B—B is dependent on the attitude of the rotor element of the gyroscope so that the pick-off device herein can detect the attitude of the gyro rotor element relative to the pick-off core structure 11–14.

The area of the portion of the spherical surface of armature 26 which is opposite the pole faces of E-core element 14 is increased and the area of the portion of the spherical surface of armature 26 which is opposite the pole faces of E-core element 12 is decreased upon counterclockwise rotation of armature 26 about axis A—A. Thus, the reluctance of the path for the magnetic flux of coil 19 is decreased and the reluctance of the path for the magnetic flux of coil 17 is increased so that the inductances of coils 19 and 17 will increase and decrease, respectively. An opposite situation obtains for clockwise rotation of armature 26 about the axis A—A.

The inductances of coils 17 and 19 are linearly variable with angular displacement of armature 26 about the axis A—A as long as portions of the spherical outer surface of armature 26 are simultaneously opposite at least a portion of the curved pole faces of both of E-cores 12 and 14. The dash-dot line 44 in Fig. 2 represents the extreme counterclockwise position of armature 26 about the axis A—A, for example, beyond which a linear variation in the inductances of coils 17 and 19 will not be obtained. In one pick-off device constructed in accordance with the present invention the range over which the inductances of coils such as 17 and 19 are linearly variable is ±20 degrees from a null position for the armature 26 about the axis A—A whereat equal areas of the spherical surface of armature 26 are opposite the curved pole faces of cores 12 and 14.

Looking at the pick-off device from the left in Figs. 1 and 2, counterclockwise rotation of armature 26 about axis B—B causes the area of the portion of the spherical surface of armature 26 which is opposite the pole faces of E-core element 11 to increase while the area of the portion of the spherical surface of armature 26 which is opposite the pole faces of E-core element 13 decreases. This increases the inductance of coil 16 and decreases the inductance of coil 18. A reverse situation obtains for clockwise rotation of armature 26 about axis B—B. The inductances of coils 16 and 18 are linearly variable for rotation of armature 26 about the axis B—B over the same range of angles about this axis as those with reference to coils 17 and 19 about the axis A—A.

Figure 3:
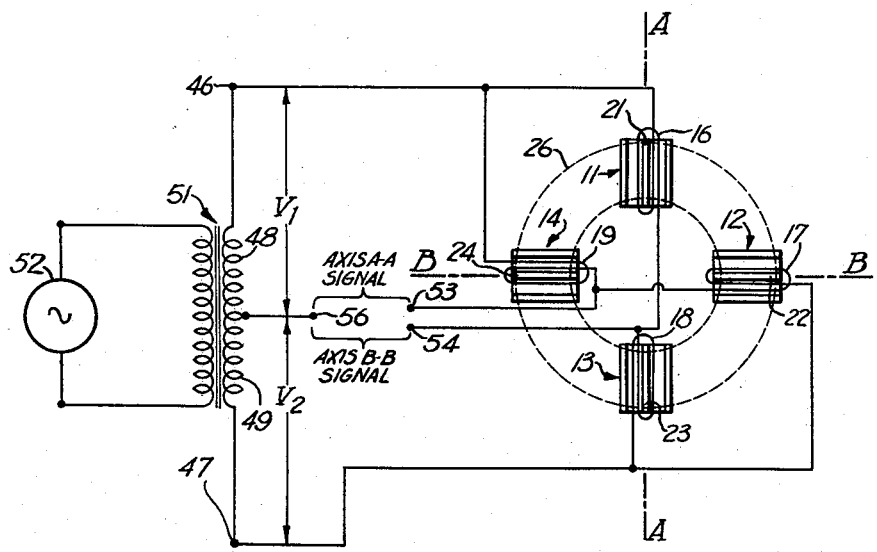
Fig. 3 is a schematic diagram illustrating the pick-off coils of Fig. 1 about their core elements and a first circuit arrangement in which the coils may be included.

The inductance coils 16–19 of Figs. 1 and 2 are coupled together in a circuit as is schematically illustrated in Fig. 3. The coils 16 and 18 are electrically connected in series between two input terminals 46 and 47, thereby forming a first coil group. The coils 17 and 19 are also connected in series between the input terminals 46 and 47 thereby forming a second coil group in parallel with the first. The coils of each group may be wound in the same or opposite directions, the latter being preferable.

Impedance means comprising symmetrical halves 48 and 49 of the secondary winding of a center-tapped, iron core transformer 51 are also coupled between the terminals 46 and 47. The winding halves 48 and 49 comprise a balanced circuit for supplying the coils 16–19 with balanced alternating current voltages $V_1$ and $V_2$. The primary winding of transformer 51 is coupled to a suitable sine wave source 52 of alternating voltage at 115 volts and 400 cycles per second, for example. Other means such as a center-tapped resistor or a balanced circuit of capacitors could be substituted for the transformer 51 for providing the balanced voltages $V_1$ and $V_2$.

A first output terminal 53 is coupled to an intermediate connecting junction between inductance coils 17 and 19. A second output terminal 54 is coupled to an intermediate connecting junction between inductance coils 16 and 18. A further output terminal 56 is connected to a symmetrical point between the two winding halves 48 and 49 at the electrical mid-point of the secondary winding of transformer 51.

The pair of coils 17 and 19 and the two winding halves 48 and 49 effectively comprise a first bridge-type network wherein the magnitude of an alternating current output voltage signal provided between terminals 53 and 56 is a function of the angular displacement of armature 26 about the axis A—A. The pair of coils 16 and 18 and the two winding halves 48 and 49 effectively comprise a second bridge-type network in parallel relationship with the first network wherein the magnitude of an alternating current output voltage signal provided between terminals 54 and 56 of the second bridge type network is a function of the angular displacement of armature 26 about the axis B—B.

When the armature 26 in Figs. 1 and 2 is in a position whereat the plane of the base line 10 thereof is perpendicular to the axis C—C, as shown in solid lines in Fig. 1, the magnetic surface of the armature as defined by the base line 10 overlaps the E-cores 11-14 equally, and the armature is at null positions about both axes. Thus, the reluctances of the paths for the magnetic fields of the coils 16-19 are substantially equal to each other, and the inductances of these coils are equal to each other. Therefore, a null output voltge signal is provided between the pair of output terminals 53 and 56 in Fig. 4 and a null output voltage signal is provided between terminals 54 and 56, the aforementioned bridge-type networks being balanced. If the aforementioned null output voltage signals contain quadrature voltage components, as may be the case if the cores 11-14 are not perfectly homogeneous with each other and/or the coils 16-19 are not perfectly homogeneous with each other, the quadrature voltage components may be balanced out in a conventional manner by the insertion of a resistor (not shown) of empirically determined value across coil 16 or 18 of one bridge-type network and a further resistor (not shown) of empirically determined value across coil 17 or 19 of the other bridge-type network. Thus, the output voltage signals provided at terminals 53 and 56 and terminals 54 and 56 can be made to be substantially zero for the null positions of the armature 26 about the axes A—A and B—B, respectively.

Armature 26 displacement in either direction about the axis A—A from its null position about this axis causes the inductances of coils 17 and 19 to vary in opposite directions. Therefore, the bridge-type network comprising the symmetrical winding halves 48 and 49 and the pair of coils 17 and 19 is unbalanced and an alternating current output voltage signal is provided between the terminals 53 and 56. It has been found that the magnitude of an output voltage signal provided between terminals 53 and 56 is a linear function of the extent of the angular displacement of armature 26 from its null position about the axis A—A, and that this output voltage signal is substantially a pure sine wave. The phase of the output voltage signal between terminals 53 and 56 for armature 26 displacements about the axis A—A in a clockwise direction from its null position about this axis is 180 degrees different from the phase of the output voltage signal between terminals 53 and 56 for armature 26 displacements about the axis A—A in a counterclockwise direction from its null position about this axis.

Armature 26 displacement in either direction about the axis B—B from its null position about this axis causes the inductances of coils 16 and 18 to vary in opposite directions. Therefore, the bridge-type network comprising the symmetrical winding halves 48 and 49 and the pair of coils 16 and 18 is unbalanced and an alternating output voltage signal is provided between the terminals 54 and 56. It has also been found that the magnitude of an output voltage signal provided between the terminals 54 and 56 is a linear function of the extent of the angular displacement of armature 26 from its null position about the axis B—B, and that this output voltage signal is substantially a pure sine wave. The phase of the output voltage signal between terminals 54 and 56 for armature 26 displacements from its null position about the axis B—B in a clockwise direction is 180 degrees different from the phase of the output voltage signal between these terminals for armature 26 displacements from its null position about the axis B—B in a counterclockwise direction.

The output voltage signals provided between terminals 53 and 56 and between terminals 54 and 56 are independent of each other. Armature 26 displacements about the axis A—A have substantially no effect on the output voltage provided between terminals 54 and 56 since no change occurs in the relative relationship between the surface areas of armature 26 opposite the pole faces of E-cores 11 and 13 which would cause a change in the ratio between the inductances of coils 16 and 18. Likewise, armature displacements about the axis B—B have substantially no effect on the output voltage provided between terminals 53 and 56 since no change occurs in the relative relationship between the surface areas of armature 26 opposite the pole faces of E-cores 12 and 14 which would change the ratio between the inductances of coils 17 and 19.

Figure 4:
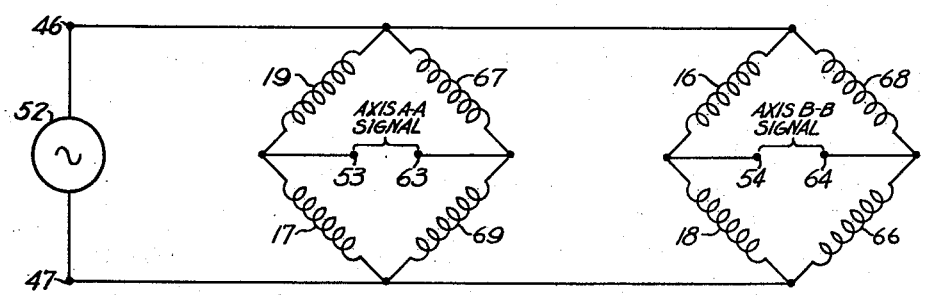
Fig. 4 is a schematic diagram of an alternative circuit arrangement in which the pick-off coils of Figs. 1 and 2 may be included.

If it is desired to avoid a center-tapped impedance as shown in the circuit of Fig. 3, an alternative circuit arrangement as shown in Fig. 4 may be utilized. Impedance means comprising identical serially connected inductors 67 and 69 are connected across coils 19 and 17 for providing a first bridge-type network and impedance means comprising identical serially connected inductors 68 and 66 are connected across coils 16 and 18 for providing a second bridge-type network. An output terminal 63 is connected between inductors 67 and 69 so that an output voltage signal related to armature 26 displacement about the axis A—A may be derived between terminals 53 and 63. An output terminal 64 is connected between inductors 66 and 68 so that an output voltage signal related to armature 26 displacement about the axis B—B may be derived between terminals 54 and 64.

The inductor 67 may comprise a coil disposed along the center arm 22 of E-core 12 in Figs. 1 and 2 adjacent one end of coil 17 and coaxial therewith. Likewise, the inductor 69 may comprise a coil similar to inductor coil 67 and disposed along the center arm 24 of E-core 14 adjacent a corresponding end of coil 19 and coaxial therewith. Thus, the inductances of coils 17 and 67 in Fig. 4 will always change in the same direction and the inductances of coils 19 and 69 will always change in the same direction (opposite the change in the inductances of coils 17 and 67) with angular displacements of armature 26 about the axis A—A.

Similarly, the inductor 68 may comprise a coil disposed along the center arm 23 of E-core 13 adjacent one end of coil 18 and coaxial therewith. The inductor 66 may also comprise a coil similar to inductor coil 68 and disposed along the center arm 21 of E-core 11 adjacent a corresponding end of coil 16 and coaxial therewith. Therefore, the inductances of coils 16 and 66 will always change in the same direction and the inductances of coils 18 and 68 will always change in the same direction (opposite the change in the inductances of coils 16 and 66) with angular displacements of armature 26 about the axis B—B.

As the armature 26 is displaced about the axis A—A from a null position whereat the ratio of the inductance of coil 19 to the inductance of coil 17 is substantially equal to the ratio of the inductance of coil 67 to the inductance of coil 69, an alternating voltage signal is provided between terminals 53 and 63 whose magnitude is substantially a linear function of the extent of angular displacement of armature 26 from the null position. This result is provided since the ratio of the inductances of coils 19 to 17 must change in an opposite direction from the change in the ratio of the inductances of coils 67 to 69. The phase of the output voltage signal is dependent on the direction of the displacement of armature 26 from the aforementioned null position about the axis A—A, being of opposite phase for displacements in opposite angular directions from the armature null position. It is evident, for similar reasons, that angular displacements of armature 26 about the axis B—B from its null position will cause an output voltage signal to be provided between terminals 54 and 64 whose magnitude is a function of armature 26 displacement about the axis B—B and whose phase is dependent on whether the armature 26 is displaced on one side or the other of its null position about axis B—B.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for detecting relative movement from a null position between parts in a system around first and second axes which pass through a common intersection, said apparatus comprising a gyroscope rotor case made of magnetic material and mounted for respective movements about said first and second axes, said case being in the form of a truncated sphere having its spherical center at said intersection and also having a base line that circles the case and lies crosswise of the respective lines of travel of the case about said axes, a stator having attached thereto a plurality of inductive reactors peripherally spaced from each other along a circle around said base line, of said plurality of reactors there being reactors located on opposite sides of said first axis and also reactors located on opposite sides of said second axis, each of said reactors comprising a magnetic core and a reactance coil wound thereon, each of said cores having a yoke and a plurality of poles extending therefrom and terminating in a plurality of concave pole faces spaced radially outward from and facing the magnetic outer spherical surface of the rotor case in the region of said base line, the curvature of said pole faces being concentric with the spherical surface of the case with respect to said intersection, the pole faces of each reactor being peripherally spaced from each other around said base line, said pole faces and said rotor case being related to provide in said null position a predetermined amount of overlap of each of said faces by a magnetic spherical surface portion of the rotor as defined by said base line, said rotor case being responsive to movement about the first axis to vary the overlap ratio between the reactors on opposite sides of the first axis, said rotor case being responsive to movement about the second axis to vary the overlap ratio between the reactors on opposite sides of the second axis, opposite directions of movement causing opposite ratio changes, the reactance value of each reactor being changeable in response to change of said overlap of the reactor, and reactance bridge means for detecting changes in the reactance values of said reactors in response to rotor case movements about any of said axes, said bridge means including said reactors as reactance arms of the bridge means.

2. Apparatus for detecting relative movement from a null position between parts in a system around first and second axes which pass through a common intersection, said apparatus comprising a gyroscope rotor case made of magnetic material and mounted for respective movements about said first and second axes, said case being in the form of a truncated sphere having its spherical center at said intersection and also having a base line that circles the case and lies crosswise of the respective lines of travel of the case about said axes, a stator having attached thereto a plurality of reactors peripherally spaced from each other along a circle around said base line, of said plurality of reactors there being reactors located on opposite sides of said first axis and also reactors located on opposite sides of said second axis, each of said reactors comprising a magnetic core and a reactance coil wound thereon, each of said cores having a yoke and a plurality of poles extending therefrom and terminating in a plurality of concave pole faces spaced radially outward from and facing the magnetic outer spherical surface of the rotor case in the region of said base line, the curvature of said pole faces being concentric with the spherical surface of the case with respect to said intersection, said pole faces and said rotor case being related to provide in said null position a predetermined amount of overlap of each of said faces by a magnetic spherical surface portion of the rotor as defined by said base line, said reactors being the only reactors carried by said stator with pole faces in magnetic inductive relation with the spherical magnetic surface of the rotor case, said rotor case being responsive to movement about the first axis to vary the overlap ratio between the reactors on opposite sides of the first axis, said rotor case being responsive to movement about the second axis to vary the overlap ratio between the reactors on opposite sides of the second axis, opposite directions of movement causing opposite ratio changes, the reactance value of each reactor being changeable in response to change of said overlap of the reactor, and reactance bridge means for detecting changes in the reactance values of said reactors in response to rotor case movements about any of said axes, said bridge means including said reactors as reactance arms of the bridge means.

3. Apparatus for detecting relative movement from a null position between parts in a system around first and second axes which pass through a common intersection, said apparatus comprising a truncated spherical gyroscope rotor case made of magnetic material and mounted for respective movements around said first and second axes, said case having its spherical center at said intersection and also having a base line circling the case and lying crosswise of the respective lines of travel of the case around said axes, a stator having first, second, third and fourth inductive reactors disposed around said base line, the first and second reactors being located on opposite sides of the first axis, the third and fourth reactors being located on opposite sides of the second axis, each of said reactors comprising a magnetic core and a reactance coil wound thereon, each of said cores having a yoke and a plurality of poles extending therefrom and terminating in a plurality of concave pole faces spaced radially outward from and facing the rotor case in the region of said base line, the curvature of said faces being concentric with the spherical surface of the rotor case, the pole faces of each reactor being spaced from each other peripherally along a circle that is substantially concentric with said base line when said apparatus is in said null position, said pole faces and said rotor being related to provide in said null position a predetermined amount of overlap of each of said faces by the magnetic spherical surface portion of the rotor as defined by said base line, said rotor being responsive to rotation about the first axis to move said base line to change the ratio between the overlapped pole areas of the first and second reactors, said rotor being responsive to rotation about said second axis to move said base line to change the ratio between the overlapped pole areas of the third and fourth reactors, opposite directions of rotation causing opposite ratio changes, the reactance value of each reactor being changeable in response to change of said overlap of the reactor, first bridge means including said first and second reactors as bridge arms for providing an output responsive to the reactance ratio between said first and second reactors and second bridge means including said third and fourth reactors as bridge arms for providing an output responsive to the reactance ratio between said third and fourth reactors.

4. The apparatus of claim 3 wherein the first and second bridge means comprise a voltage source having opposite end terminals and an intermediate terminal, said first and second reactance elements being connected in series across said end terminals, said third and fourth reactance elements being connected in series across said end terminals, said intermediate terminal and the junction between the first and second elements comprising the output of one bridge means, and said intermediate terminal and the junction between the third and fourth elements comprising the output of the other bridge means.

References Cited in the file of this patent

UNITED STATES PATENTS

| | | |
|---|---|---|
| 2,474,549 | Schoeppel | June 28, 1949 |
| 2,484,022 | Esval | Oct. 11, 1949 |
| 2,515,969 | Shivers | July 18, 1950 |
| 2,564,221 | Hornfeck | Aug. 14, 1951 |
| 2,567,682 | Silberstien | Sept. 11, 1951 |
| 2,685,207 | Barkalow | Aug. 3, 1954 |
| 2,878,445 | Scarborough | Mar. 17, 1959 |